United States Patent
Perren et al.

(10) Patent No.: US 9,232,817 B2
(45) Date of Patent: Jan. 12, 2016

(54) METHOD FOR THE SURFACE-PASTEURIZATION AND-STERILIZATION OF PIECES OF FOOD

(75) Inventors: Rainer Perren, Grosswangen (SE); Jürgen Fischer, Oberderdingen (DE)

(73) Assignee: BÜHLER BARTH GMBH, Freiberg am Neckar (DE)

( * ) Notice: Subject to any disclaimer, the term of this patent is extended or adjusted under 35 U.S.C. 154(b) by 126 days.

(21) Appl. No.: 12/648,067

(22) Filed: Dec. 28, 2009

(65) Prior Publication Data

US 2010/0173060 A1 Jul. 8, 2010
US 2013/0040030 A9 Feb. 14, 2013

Related U.S. Application Data

(63) Continuation of application No. PCT/EP2008/002907, filed on Apr. 12, 2008.

(30) Foreign Application Priority Data

Jul. 2, 2007 (DE) .......................... 10 2007 030 660
Mar. 19, 2008 (DE) .......................... 10 2008 015 062

(51) Int. Cl.
*A23L 1/00* (2006.01)
*A23L 3/16* (2006.01)
(Continued)

(52) U.S. Cl.
CPC .................. *A23L 3/165* (2013.01); *A23B 9/025* (2013.01); *A23L 3/0155* (2013.01)

(58) Field of Classification Search
USPC .................................. 426/521, 461, 507, 459
See application file for complete search history.

(56) References Cited

U.S. PATENT DOCUMENTS 2,004,497 A * 6/1935 Bajda ............................ 426/444
2,278,473 A * 4/1942 Musher ............................ 426/93
(Continued)

FOREIGN PATENT DOCUMENTS

CA 2691557 * 1/2009 ................ A23L 3/16
DE 1 692 234 A1 4/1972
(Continued)

OTHER PUBLICATIONS

"Hosokawa Steam Sterilisation Process for sterilisation of herbs and spices" Hosokawa Micron B.V., Oct. 12, 2002, 4 pages.
(Continued)

*Primary Examiner* — Preston Smith
(74) *Attorney, Agent, or Firm* — Buchanan Ingersoll & Rooney PC

(57) ABSTRACT

A process for surface pasteurization/sterilization of particulate food products. Water uptake and qualitative changes of food products are minimized and pasteurization or sterilization conditions are optimized when food products are used preheated, wherein product temperature is selected a few degrees below the evaporation temperature of the pasteurization/sterilization system, in that the preheating temperature of food products is selected lower than the saturated steam temperature, preferably a few degrees below the saturated steam temperature at a predetermined pressure, in that treatment is performed in a moist, air-free atmosphere, wherein pasteurization occurs at temperatures between 55 and 99° C. at a low pasteurization pressure, or sterilization occurs at temperatures between 100° C. and 140° C. at a higher sterilization pressure, in that heat treatment occurs for 1 to 30 mins, and in that the water of condensation is removed from the surface of food products by a subsequent vacuum drying at a further reduced pressure.

7 Claims, 2 Drawing Sheets

(51) Int. Cl.
*A23B 9/02* (2006.01)
*A23L 3/015* (2006.01)

(56) References Cited

U.S. PATENT DOCUMENTS

| | | | |
|---|---|---|---|
| 2,558,854 | A | 7/1951 | Kempf et al. |
| 3,721,527 | A | 3/1973 | Lodige et al. |
| 4,161,549 | A | 7/1979 | Ohno |
| 5,718,936 | A | 2/1998 | Porter et al. |
| 6,066,351 | A | 5/2000 | Tabata et al. |
| 6,415,547 | B1 * | 7/2002 | Enomoto et al. ......... 47/58.1 SE |
| 6,579,559 | B2 | 6/2003 | Isogaya |
| 7,849,788 | B2 | 12/2010 | Macaluso |
| 2003/0198729 | A1 | 10/2003 | Fuhrmann et al. |
| 2004/0170731 | A1 | 9/2004 | Subramaniam et al. |
| 2005/0008745 | A1 | 1/2005 | Blaha |
| 2006/0147594 | A1 | 7/2006 | Long et al. |
| 2010/0136192 | A1 | 6/2010 | Perren et al. |

FOREIGN PATENT DOCUMENTS

| | | | |
|---|---|---|---|
| DE | 39 02 679 | | 8/1990 |
| DE | 699 16 279 T2 | | 4/2005 |
| DE | 102007030660.3 | * | 1/2009 ................ A23L 3/16 |
| EP | 0 729 705 A2 | | 9/1996 |
| EP | 0 993 780 A1 | | 4/2000 |
| EP | 2 173 181 | | 4/2010 |
| FR | 2 680 637 A1 | | 3/1993 |
| GB | 2 396 546 A | | 6/2004 |
| JP | 4131063 B2 | | 5/1992 |
| JP | H07-274916 A | | 10/1995 |
| JP | H11-056238 A | | 3/1999 |
| JP | 2006-334324 A | | 12/2006 |
| NL | 510718 | | 2/2002 |
| WO | WO 01/43572 | | 6/2001 |
| WO | 03/037109 A1 | | 5/2003 |
| WO | 03/043665 A1 | | 5/2003 |
| WO | 2004/066710 A1 | | 8/2004 |
| WO | 2006/040029 | | 2/2005 |
| WO | 2009/003545 A1 | | 1/2009 |

OTHER PUBLICATIONS

M. M. Gysel, "Die Entkeimung von pflanzlichen Trockenpro—dukten mit Sattdampf" [Sterilization of Vegetable Dry Products with Saturated Steam], dissertation ETH No. 9203, Swiss Technical University ETH, Zurich, Oct. 1990, with English Translation (7 pages).

M. Kozempel et al., "The Vacuum/Steam/Vacuum Process", Food Technology 57 (12), 30-33, Dec. 2003 (1 page).

J.-P. Clark, "Thermal Processing of Foods", Food Technology, vol. 61, No. 04, Apr. 2007 (5 pages).

Office Action issued by the U.S. Patent and Trademark Office in the U.S. Appl. No. 12/648,023, mailed Jan. 30, 2012, U.S. Patent and Trademark Office, Alexandria, VA. (9 pages).

Office Action issued by the U.S. Patent and Trademark Office in the U.S. Appl. No. 12/648,023, mailed Jul. 23, 2012, U.S. Patent and Trademark Office, Alexandria, VA. (9 pages).

Office Action issued by the U.S. Patent and Trademark Office in the U.S. Appl. No. 12/648,023, mailed Jul. 17, 2013, U.S. Patent and Trademark Office, Alexandria, VA. (16 pages).

Office Action issued by the U.S. Patent and Trademark Office in the U.S. Appl. No. 12/648,023, mailed Dec. 16, 2013, U.S. Patent and Trademark Office, Alexandria, VA. (11 pages).

Office Action issued by the U.S. Patent and Trademark Office in the U.S. Appl. No. 12/648,023, mailed Jun. 20, 2014, U.S. Patent and Trademark Office, Alexandria, VA. (12 pages).

Office Action issued by the U.S. Patent and Trademark Office in the U.S. Appl. No. 12/648,023, mailed Mar. 30, 2015, U.S. Patent and Trademark Office, Alexandria, VA. (11 pages).

* cited by examiner

METHOD FOR THE SURFACE-PASTEURIZATION AND-STERILIZATION OF PIECES OF FOOD

CROSS-REFERENCE TO RELATED APPLICATION

This application claims the benefit of the priority filing date of international application no. PCT/EP2008/002907 and German application nos. 10 2007 030 660.3 filed on Jul. 2, 2007 and 10 2008 015 062.2 filed on Mar. 19, 2008.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The invention relates to a method for the surface pasteurization or surface sterilization of pieces of food products, in particular, oleaginous seeds, such as almonds, hazelnuts, pecans, walnuts, as well as peanuts, bran, cereals, coffee, cocoa and the like.

By nature, agricultural products and foods are loaded with harmless and potentially pathogenic micro-organisms. In most cases, agricultural products are processed fresh, or are made durable with the aid of suitable technological means. Among the various industrially employed preservation methods are, inter alia, sterilization or pasteurization by means of heat, irradiation with ionizing rays, and gassing with lethally-acting gases. The two last-mentioned methods, in particular, can only be employed in a limited manner because the use of these methods is strictly regulated by law.

Lately, several cases of contamination of raw almonds with salmonella have been reported. To increase the safety of almond products, U.S. authorities have ordered that, starting in autumn of 2007, the entire almond harvest be pasteurized or heat-treated to a sufficient degree. The pasteurization of almonds and other oleaginous seeds imposes special demands on the methods to be used. The water content of the almonds is not allowed to be increased to an appreciable degree by and during treatment, because both the storage capability and the integrity of the almonds are harmed. Moreover, raw almonds tend to lose the skin around the seed, thereby decreasing quality.

For this reason a heat-deactivation method is presented here, which is suitable to considerably reduce the microbial surface contamination of almonds, oleaginous seeds and other pieces of food having a medium or low water content, without changing the qualitative properties of the products (water content, appearance, aroma and taste, texture). In accordance with the regulations of U.S. authorities, in the case of raw almonds, it is possible to speak of pasteurization in connection with a reduction of the micro-flora by 5 log-units.

Efficient heat-deactivation of micro-organisms is achieved in an atmosphere with increased water activity. In contrast thereto, micro-organisms are only reduced to a small extent by dry heating. For this reason, heat-pasteurization and sterilization methods employed on an industrial scale require a large amount of water content of the products. This relates in particular to sterilization and pasteurization methods employed in the preserved food and beverage industries, or for preserving milk and milk products.

Above all, pasteurization or sterilization is problematic in connection with pieces of products showing a low water activity of less than 0.8 and which, in the case of heat treatment, cannot be subjected to a greater water content. This applies in particular to almonds, nuts and other oleaginous seeds, but also to spices and other pieces of food products. The treatment of raw, unblanched almonds in particular is difficult because, on the one hand, changes in aroma and color progress rapidly in the course of heat treatment in a moist atmosphere and, on the other, a release of the skin around the seed, such as is provoked by the application of water, must be absolutely avoided. It is thus possible to consider that pasteurization of raw almonds is something that is in high demand.

For example, methods are employed for heat-deactivation of dry spices, in which the spices are charged for a short time with saturated or super-saturated steam in a pressure chamber, and the pressure is subsequently released (Gysel, 1990). The sudden pressure release leads to a separation of micro-organisms from the surface and to the bursting of bacterial cells. The joint action of moist heat and a mechanically-acting pressure-release process leads to directed and rapid deactivation of micro-organisms.

However, methods operating in accordance with this principle are not suited to the surface pasteurization of almonds and other oleaginous seeds. On the one hand, the water content is greatly increased by the application of saturated or superheated steam at a pressure of >1 bar (temperatures above 100° C.) because of the occurring condensation. This considerable water intake, such as arises from such treatment, makes subsequent drying necessary and leads to a reduction of the quality and the shelf-life of the products. On the other hand, the integrity of the products is damaged, in particular because of the retention of a large proportion of surface water and because of the occurring mechanical forces in the course of pressure relaxation. In the case of raw almonds or other non blanched seeds, in particular oleaginous seeds, the skin comes off, which is detrimental to quality.

The CFP Power Pasteurization System of the Ventilex Company (West Chester, Ohio) is explained in the website www.nutpasteurization.net and was especially developed for the pasteurization of almonds. This method consists of a continually conveying fluid chamber, into which almonds are placed, and are treated under overpressure with superheated steam. Subsequently, the nuts are dried in a continuously-conveying chamber by warm air, and are then cooled. Because of the enormous condensation during treatment, the Ventilex method increases the water content of the almonds to a considerable extent from approximately 5% up to 10%, which impairs the quality of the pasteurized almonds to a substantial degree and leads to the detachment of parts of the skin during subsequent hot-air drying. Moreover, the high treatment temperatures lead to undesired changes in the color and aroma of the almonds.

in accordance with the JSP-I Jet Stream@ Almond Surface Pasteurization System of the firm FMC Technologies (Sandusky, Ohio), almonds are heated to a preset temperature by means of steam; the almonds are then subsequently pasteurized in moist air. Pasteurization takes place in a continuous chamber in moist air, wherein the dew-point temperature of the air is considerably higher than the temperature of the introduced almonds (Gunawardena and Weng, 2006). The moist air condenses on the almond surface which, together with the effect of the heat, leads to the desired deactivation of micro-organisms. This method, too, leads to a large amount of water condensation, so that, subsequent to pasteurization, the water must be dried off by means of hot air. As a result, almond quality is greatly impaired by the large absorption of water during heating with steam and pasteurization in moist air, as well as subsequent drying.

Clark (2007) has described further modifications of steam-treating methods. The Safesteril method of the ETIA company, F-Compiègne (*Antonini,* 1993) is a continuous method for the treatment of pieces of goods and powders with steam. Here, a product flow is transported by means of a heated screw through a closed chamber and is charged with steam in it. Since this treatment takes place at normal pressure, steam is condensed out until the material has reached a temperature of 100° C. Here, heating the product by means of the screw is intended to prevent an excessive condensation of steam on the product, which, in the end, is a function of the heat introduction via the heated screw. Because of the mechanical action by means of the screw transport, but mainly because of the distinctive water introduction, this method is not suitable for the heat treatment of raw almonds and oleaginous seeds.

Further methods employ a saturated steam atmosphere under reduced pressure. Kozempel et al. (2003) describes a vacuum-steam-vacuum method for pasteurizing food surfaces. In this process, pieces of material are alternatingly subjected to a vacuum and charged with steam. The alternating application of vacuum and steam is intended to assure that condensation reaches all pore openings and depressions in the surface.

The method of Steam Lab Systems (CH-Bottmingen) (Blaha, 2003) represents a method derived from this. With this method, the product is subjected, as described, to a cycle of vacuum and steam treatment. The introduction of water vapor following a vacuum step takes place until atmospheric pressure has been reached. On the basis of the varying pressure conditions it must be assumed that water vapor condenses until normal pressure conditions have been reached, which again leads to a relevant absorption of water. In addition, temperature conditions, such as those that prevail on the surface in the course of the process, are insufficiently defined, which is also detrimental to the safety of the process.

Thus, all pasteurization methods for almonds and other piece-sized goods known and described here have in common the following:

that the treatment is performed in a moist atmosphere under normal or overpressure conditions or, respectively in the case of the vacuum methods, until the occurrence of normal pressure conditions; it can therefore be assumed that with complete provision of an equilibrium the surface temperature is 100° C. or more; in this case reactions which negatively affect product quality proceed very rapidly;

that, based on intentional heat introduction they lead, because of condensation, to a significant increase of water content of more than 2%; a (temporary) increase of water content in said amount is very detrimental to the quality of the pasteurized product because cooking aromas are developed and the surface structures, such as the skins of almonds, for example, disintegrate and are destroyed;

that, because of large absorption of water, hot air drying becomes necessary; in the course of drying in hot air, degenerative changes occur, such as browning reactions, from which a relevant loss of quality and a considerable loss of authenticity of the product results;

that the pasteurization conditions can only be insufficiently reproduced because the surface temperature remains constant only after reaching the equilibrium temperature (100° C. under normal conditions); the absence of constant pressure conditions leads to inaccurately defined pasteurization conditions on a product surface.

It is therefore the object of the invention to create a method, of the type mentioned at the outset, with which water absorption and qualitative changes of the food products are minimized and pasteurization or sterilization conditions are optimized.

In accordance with the invention, this is achieved in that the food products are employed after having been pre-warmed, wherein the product temperature is selected to lie a few degrees below the evaporation temperature of the pasteurization or sterilization systems, that the pre-warming temperature of the food products is selected to be lower than the saturation temperature, preferably a few degrees below the saturated steam temperature at a preset pressure, that treatment is performed in a moist atmosphere free of air, wherein pasteurization is performed at temperatures between 55 and 99° C. at low pasteurization pressure, or sterilization at temperatures between 100° C. and 140° C. at a higher sterilization pressure, that the heat treatment is performed in the course of 1 to 30 mins, and that the condensation water is removed from the surface of the food products by means of subsequent vacuum drying under further reduced pressure.

The novel method consists of three steps:

1) preheating the food products, 2) pasteurization or sterilization in a pure steam atmosphere, wherein the surface temperature corresponds to the evaporation temperature at the system pressure set, 3) drying of the surface condensation water under vacuum.

So that all other pieces of food products, such as nuts, oleaginous seeds, grains, spices and the like can be optimally pasteurized or sterilized, the following basic rules should be observed:

1. To reduce losses in quality, it is necessary to optimally select and adjust the surface pasteurization or sterilization temperature. By means of matching the system pressure it is possible to set the evaporation temperature, and thereby the condensation temperature, in a directed and reproducible manner. The system pressure can be maintained constant in a range between 0.15 to 4.0 bar, by means of which it is possible to realize pasteurization temperatures of 55 to 99° C. and sterilization temperatures of 100° C. to 140° C.

2. Since water absorption and subsequent drying definitely contribute to the reduction of the quality of the food products an unnecessary or excessive absorption of water is avoided. This is achieved in that the food products are intentionally pre-warmed by 0 to 8° C. below the evaporation temperature. In this way, it is possible to limit the water absorption required for warming to less than 0.5%, which makes subsequent hot air drying superfluous.

3. A small remaining amount of water present on the surface can be removed in a short time by reducing the system pressure. Moreover, the food products are immediately cooled by the evaporation of surface water, so that the action of the heat can be rapidly terminated.

The basic rules are followed by the characteristics detailed in the dependent claims in that they are observed during the three method steps.

1. Pre-warming. Pre-warming of the food products takes place preferably in an apparatus in which the food products are rapidly warmed to the intended temperature for preventing the premature removal of water. For example, pre-warming can take place in a continuous infrared drum by means of hot air or microwaves. The method also does not exclude pre-warming by other energy transmission possibilities. The pre-warming step is used for conditioning the food products and at best makes a negligible contribution to the deactivation of micro-organisms on the surface of the material. The pre-warming temperature is selected to be such that during the subsequent steam treatment the evaporation temperature is 0 to 8° C. higher than the pre-warming temperature. In this way, it is possible to avoid an excessive condensation of water vapor on the product surface and an excessive water absorption by the food products during the subsequent steam treatment. Thus, the pre-warming temperature can lie in the range between 50 to 144° C. The range between 55 and 99° C. can preferably be selected for pasteurization, and the range between 100 to 140° C. for sterilization. For pasteurizing almonds, the pre-warming temperature preferably lies between 70° C. and 90° C.

2. Pasteurization in a Steam Atmosphere. Heat deactivation (pasteurization or sterilization) takes place at temperatures between 50 and 140° C. Customarily only pasteurization is achieved with treatments below 100° C., while temperatures up to 144° C. must be reached for sterilization (complete deactivation even of thermostable endospores). In this case, the treatment temperature is determined by the steam pressure prevailing or set in the system. With treatment temperatures below 100° C., the system pressure becomes less, at treatment temperatures above 100° C., the system pressure becomes greater than the atmospheric pressure.

System pressures below atmospheric pressure are realized in that the pressure in the treatment chamber is reduced by means of a vacuum pump. As soon as the set system pressure falls below the set value, the steam supply valve opens and steam supply is started. Steam supply takes place via a regulating valve, which maintains the system pressure in the treatment chamber constant. For example, the treatment of almonds takes place at an absolute pressure of 0.1 to 0.95 bar, preferably at 0.2 to 0.8 bar.

After filling, the product temperature lies 0 to 8° C. below the evaporation temperature of the system. The temperature of the material rapidly rises to the evaporation temperature because of the condensation of small amounts of water. Then, water can no longer condense on the product surface; the system is in equilibrium. As a function of the steam saturation temperature, the amount of time (1 to 30 mins) of heat application must be selected in such a way that a sufficient deactivation of micro-organisms is achieved.

3. Removal of Surface Water. At the end of the treatment, the steam supply is shut off, while the vacuum pump continues to run. By means of further reduction of system pressure to between 0.15 to 0.01 bar (absolute pressure), the amount of water picked up because of temperature equalization can be dried off again in a short length of time of 2 to 20 mins, so that the pasteurized sterilized food products do not show an increase in water content.

SUMMARY

The invention relates to a process for the surface pasteurization or surface sterilization of particulate food products. The water uptake and qualitative changes of the food products are minimized and the pasteurization or sterilization conditions are optimized in that the food products are used pre-heated, wherein the product temperature is selected a few degrees below the evaporation temperature of the pasteurization or sterilization system, in that the preheating temperature of the food products is selected lower than the saturated steam temperature, preferably a few degrees below the saturated steam temperature at a predetermined pressure, in that the treatment is performed in a moist, air-free atmosphere, wherein the pasteurization is carried out at temperatures between 55 and 99° C. at a low pasteurization pressure, or the sterilization is carried out at temperatures between 100° C. and 140° C. at a higher sterilization pressure, in that the heat treatment is carried out for 1 to 30 mins, and in that the water of condensation is removed from the surface of the food products by a subsequent vacuum drying at a further reduced pressure.

DESCRIPTION

Figure 1:
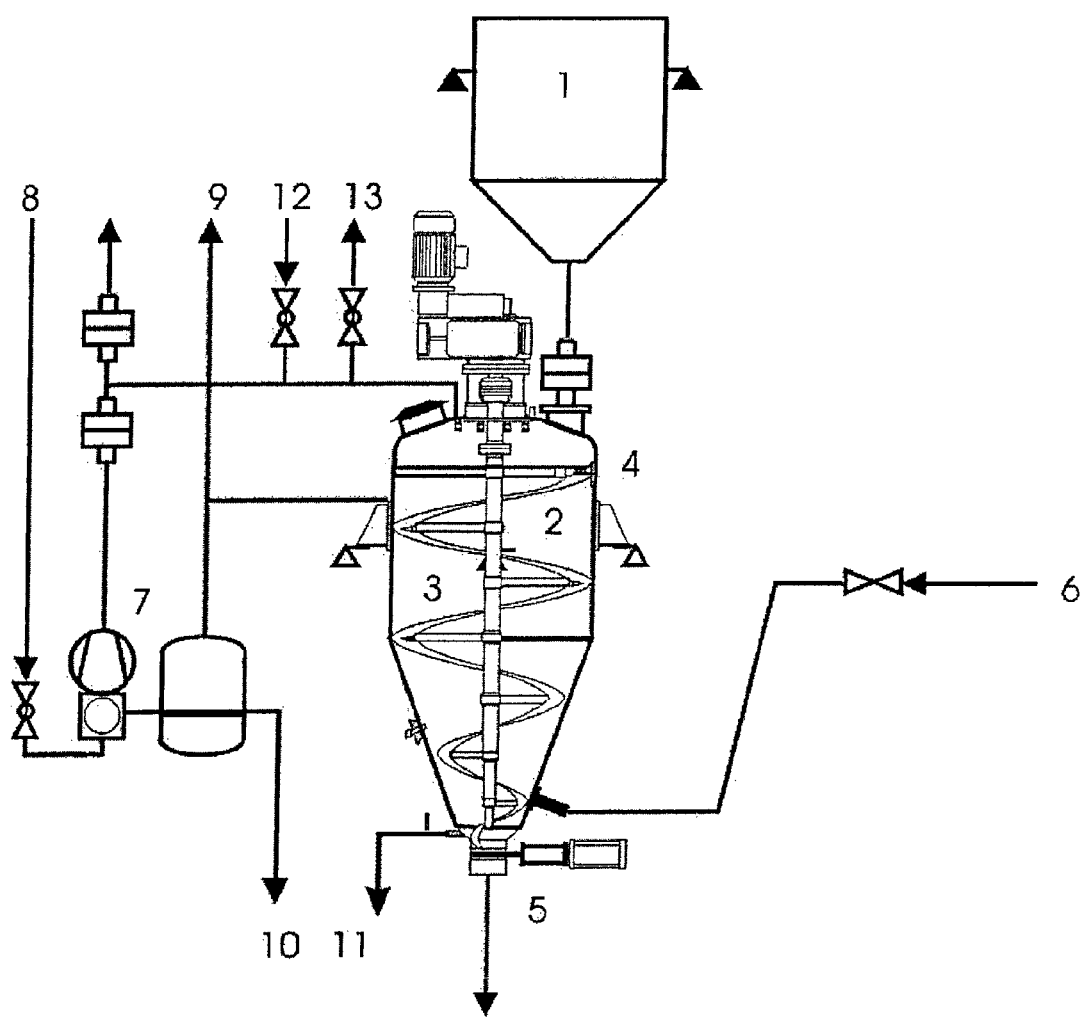
FIG. 1, a device for the surface pasteurization of pieces of food in accordance with the CCP method in accordance with the invention, and FIG. 2, survival curve and log-reduction of Enterococcus faecium on almonds pasteurized in accordance with the CCP method at 81.4° C. (system pressure 0.5 bar).

The method here described is for example performed in a device as represented in FIG. 1. The food product, which has been pre-warmed to a predetermined temperature by means of a suitable method is presented in a pre-container 1. By opening a flap 4, the food product is filled into a pressure chamber 2. The pressure chamber 2 is provided with a double shell, and by means of steam the shell is maintained at a pre-selected temperature corresponding to the selected conditions. After the filled pressure container has been closed in a pressure-tight manner, the pressure is reduced by means of a vacuum pump 7. Once the preselected pressure has been reached, a steam valve 6 is opened. The admittance of steam is regulated by means of a regulator valve in such a way that the pressure in the chamber remains constant and corresponds to preset conditions. Depending on the selected pressure, or respectively selected temperature, and a function of the product, the pasteurization/sterilization lasts 1 to 30 mins. At the termination of the pasteurization/sterilization treatment, the steam valve 6 is closed and the pressure in the container is reduced to between 0.15 to 0.01 bar. After a further 2 to 20 mins, vacuum drying is finished. The container pressure is again matched to atmospheric pressure by means of a pressure equalization valve. A removal opening 5 is opened, and the food product is taken out. If desired, the removal of the food product can be aided by switching on a mixing spiral 3. Common process parameters for almonds, nuts and oleaginous seeds are represented in Table 1.

Figure 2:
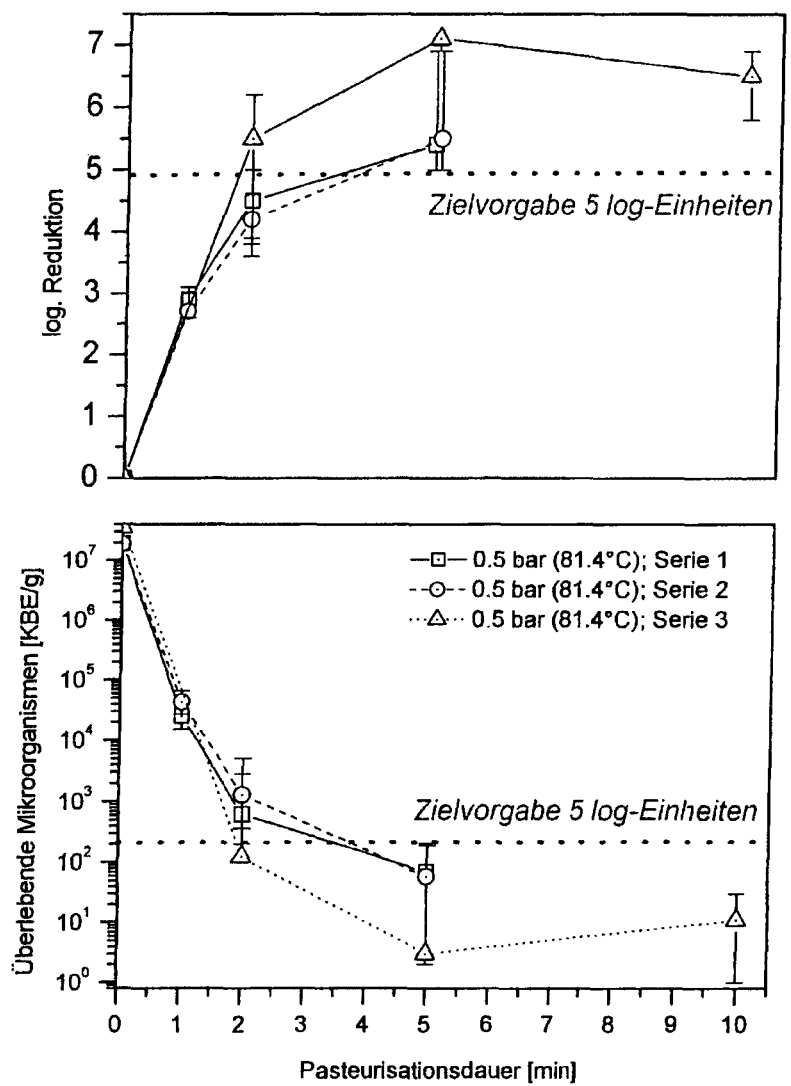

Under suitable circumstances, minimal water absorption results with this method on the surface, which can amount to less than 0.5%, depending on selected pasteurization/sterilization conditions. Nevertheless, in the course of treatment a moist atmosphere is formed around the food products. In this way, it is possible to assure that the treatment takes place in a sufficiently moist atmosphere close to a water activity of 1.0, so that a sufficient deactivation of vegetative micro-organisms and of endospores on the product surface takes place under suitable conditions (FIG. 2). The inherent quality of the food products, in particular in the case of pasteurization, is maintained with this process. Neither are aroma or color changes induced, nor can a loosening of the skin of almonds be observed at optimal parameters (s. Table 1).

The pasteurization and sterilization method herein described is also suited for thermal treatment of other oleaginous seeds, such as hazelnuts, pecans, walnuts, as well as peanuts, bran, cereals, coffee, cocoa, etc. This method is also suitable for treating pulverulent materials because the small amount of wetting and water absorption does not lead to the clumping of powder particles.

TABLE 1

Process parameters for the surface pasteurization of raw almonds inoculated with *Enterococcus faecium* NRRL-B2354. The initial contamination with *E. faecium* was 2 * 10$^7$ CFU/g.

| Pre-warm. Temp. °C. | Abs. Pasteuriz. Pressure bar | Evap. Temp./ Condensat. Temperature °C. | React. Time Minutes | Vacuum Drying Minutes | Achieved log-reduction |
|---|---|---|---|---|---|
| 80 | 0.5 | 81.5 | 2  | 5 | 5.5 |
| 80 | 0.5 | 81.5 | 5  | 5 | 7.4 |
| 80 | 0.5 | 81.5 | 10 | 5 | 6.6 |
| 90 | 0.5 | 81.5 | 2  | 5 | 5.3 |
| 70 | 0.5 | 81.5 | 10 | 5 | 7.9 |

Bibliography

G. Antonini, O. Lepez, P. Sajet, D. LaPlace, 1993, "Method and Device for Reducing or Eliminating the Microbial Flora in an Agri-Foodstuff in the Divided Solid State", FR 2680637.

J. Blaine, 2003, "Verfahren zur Entkeimung von Produkten" [Method for Sterilizing Products], WO 03/037109 A1, May 8, 2003.

J.-P. Clark, 2007, "Thermal Processing of Foods", Food Technology 61 (04), 79-82.

R. M. Gunawardena, Z. Weng, 2006, "Dry Food Pasteurization Apparatus and Method", US 2006 040029.

M. M. Gysel, 1990, "Die Entkeimung von pflanzlichen Trockenpro-dukten mit Sattdampf" [Sterilization of Vegetable Dry Products with Saturated Steam], dissertation ETH No. 9203, Swiss Technical University ETH, Zürich.

M. Kozempel, N. Goldberg and J. C. Craig, 2003, "The Vacuum/Steam/Vacuum Process", Food Technology 57 (12), 30-33.

What is claimed:

1. A method for the surface pasteurization or surface sterilization of pieces of food products with minimized water absorption, the method comprising:
   pre-warming the food products to a temperature below an evaporation temperature of pasteurization or sterilization systems, wherein the pre-warming temperature of the food product is selected to be lower than a saturation temperature;
   heat treating the food product in a pure steam atmosphere free of air, for performing pasteurization at temperatures between 55 and 99° C. at a pasteurization pressure below atmospheric pressure, or sterilization at temperatures between 100° C. and 140° C. at a sterilization pressure above atmospheric pressure, wherein the heat treatment is performed in the course of 1 to 30 mins; and
   removing condensation water from a surface of the food products by subsequent vacuum drying under a reduced pressure wherein a pressure in a treatment chamber is reduced by a vacuum pump and as soon as the pressure falls below a set value, a steam supply valve opens and a steam supply is started.

2. The method in accordance with claim 1, comprising:
   selecting the food product temperature to lie between 0° C. to 8° C. below the evaporation temperature of the pasteurization or sterilization system.

3. The method in accordance with claim 1, wherein the temperature difference between the pre-warming temperature of the food products and a saturated steam temperature in the moist atmosphere at a given pressure is selected to be 0° C. to 8° C.

4. The method in accordance with claim 3, comprising:
   selecting the pre-warming temperature of the food product to be below the saturated steam temperature at a present pressure.

5. The method in accordance with claim 1, wherein the pieces of food products are oleaginous seeds, including almonds, hazelnuts, pecans, walnuts, as well as peanuts, bran, cereals, coffee, cocoa.

6. The method in accordance with claim 1 wherein the food products are pre-warmed by at least one of an infrared drum, air and microwaves.

7. The method in accordance with claim 1 wherein the water absorption is limited to less than 0.5%.

* * * * *